United States Patent
Bao et al.

(10) Patent No.: US 8,581,836 B2
(45) Date of Patent: Nov. 12, 2013

(54) PROCESSING METHOD FOR A DEVICE HAVING A BI-STABLE DISPLAY AND APPARATUS

(75) Inventors: Sheng Hua Bao, Beijing (CN); Jian Chen, Beijing (CN); Wei Jiang, Beijing (CN); Zhong Su, Beijing (CN); Xin Ying Yang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 13/246,984

(22) Filed: Sep. 28, 2011

(65) Prior Publication Data

US 2012/0092243 A1 Apr. 19, 2012

(30) Foreign Application Priority Data

Oct. 15, 2010 (CN) .......................... 2010 1 0515944

(51) Int. Cl.
*G09G 3/34* (2006.01)

(52) U.S. Cl.
USPC ........................................... 345/107

(58) Field of Classification Search
USPC ......... 345/107, 694–696, 698, 699; 358/3.11, 358/3.2; 707/705, 758
See application file for complete search history.

(56) References Cited

U.S. PATENT DOCUMENTS

| | | | |
|---|---|---|---|
| 6,486,895 B1 * | 11/2002 | Robertson et al. | 715/776 |
| 2001/0024195 A1 * | 9/2001 | Hayakawa | 345/173 |
| 2006/0050050 A1 | 3/2006 | Zhou et al. | |
| 2007/0070470 A1 * | 3/2007 | Takami et al. | 358/527 |
| 2007/0139707 A1 * | 6/2007 | Takami et al. | 358/1.15 |
| 2007/0229485 A1 | 10/2007 | Burr et al. | |
| 2008/0151300 A1 * | 6/2008 | Kowaka et al. | 358/1.15 |
| 2009/0174651 A1 | 7/2009 | Jacobson et al. | |
| 2009/0237367 A1 * | 9/2009 | Ryu et al. | 345/173 |
| 2010/0141605 A1 * | 6/2010 | Kang et al. | 345/174 |
| 2010/0245375 A1 * | 9/2010 | Rhodes | 345/589 |
| 2011/0058223 A1 * | 3/2011 | Ishizaki | 358/1.18 |
| 2011/0080418 A1 * | 4/2011 | Rhodes | 345/522 |
| 2012/0005192 A1 * | 1/2012 | Bao et al. | 707/721 |

FOREIGN PATENT DOCUMENTS

WO 2010012831 A1 2/2010

* cited by examiner

*Primary Examiner* — Joe H Cheng
(74) *Attorney, Agent, or Firm* — Cantor Colburn LLP; Dwayne Nelson

(57) ABSTRACT

A processing method for a device having a bi-stable display includes transforming a target page to be turned to; calculating overlap between the transformed target page and a current page; and determining whether the overlap of the transformed page complies with a predetermined criterion.

22 Claims, 8 Drawing Sheets

Current page

Target page

Letter "N" in normal Arial

Letter "M" in normal Arial

Transformed letter "M" in Arial

4 Applications

4.1 Application to Image Search

Image feature is the basis of image understanding for computer, and it is the fundament of many multimedia applications such as image search from mass image data. No doubt directly comparing query images with the images in database is the simplest method. In addition, in [3], the authors present two ways to search images. 1) Hamming embedding (HE) and 2) weak geometric consistency constraint (WGC). These two approaches are based on the bag-of-feature method with k-means algorithm. However, all these methods can't solve the flip detection effectively but implement SIFT twice for every query image ($SIFT_1$ for the original query images, and $SIFT_2$ for the manually flipped ones).

Duplicate computation of SIFT for every query image is rather laborious and inflexible, we apply MIFT to address this tough problem. Note that we just implement the directly comparing method, however HE and WGC can be easily transplanted to MIFT from SIFT.

The image data are from INRIA Holidays dataset[2], and we randomly select 300 images from INRIA Holidays dataset as our database, and another 36 images Current page

Fig.5a as query set. The one third of the query images are without mirror reflection (NM), another one third are with horizontal mirror reflection (HM) and the remaining one third are with vertical mirror reflection (VM).

We separately use MIFT and SIFT to detect and describe features for every image from our database and query set. As shown in Table [1], MIFT successfully searches 35 images out of 36 in which 34 successfully registered images are first-ranking and 1 image second-ranking. There is only 1 failed to find the related images. This very image and its corresponding one in the database are shown in Fig. [5]. For SIFT, as shown in Table [1], it only correctly finds 11 non-reflection images out of 36 for the first process which contains 12 images without mirror reflection, and for the second process it finds 23 first-ranking images with horizontal or vertical mirror reflection, and 1 third-ranking which is second-ranking using MIFT. The incorrect registration image pair is the same as MIFT, as shown in Fig. [5].

The reason why the left image pair in Fig. [5] is not first-ranking is that there are too many repetitive structures within the images that lead to close arc cosine values which are rejected by OMM and IMM. To handle this problem caused by repetitive structures, W. Zhang and J. Kosecka [13] propose an additional criterion which increases true positive rate while keeps false positive low. For the Target page

Fig.5b

Overlap without applying the invention

Fig.5c

Overlap with the invention applied

PROCESSING METHOD FOR A DEVICE HAVING A BI-STABLE DISPLAY AND APPARATUS

PRIORITY

This application claims priority to Chinese Patent Application No. 201010515944.4, filed 15 Oct. 2010, and all the benefits accruing therefrom under 35 U.S.C. §119, the contents of which in its entirety are herein incorporated by reference.

BACKGROUND

The present invention relates to the field of information technology, and more particularly, to a processing method for a device having a bi-stable display and an apparatus.

Recently, bi-stable display technology such as E-ink and E-paper has been employed increasingly. In general, bi-stable display technology is a proprietary material mainly composed of microcapsules and formed in a film so as to be integrated with an electronic display. A current bi-stable display usually supports two colors, namely black and white. Each microcapsule contains positively charged white particles and negatively charged black particles suspended in a clear fluid. When a negative electronic field is applied on the top of the microcapsule, the positive white particles move to the top of the microcapsule where they become visible to the user. At the same time, a positive electronic field is applied at the bottom of the microcapsule such that the black particles move to the bottom of the microcapsule to become invisible. In this way, the screen spots corresponding to this microcapsule appear white. On the contrary, the corresponding screen spots will be black by reversing the electronic field.

Unlike a conventional display which uses backlight to illuminate its pixels, according to the bi-stable display technology, the electronic field is no longer applied when the display is in a stable state and therefore no power is consumed. In other words, the microcapsule in a bi-stable display only consumes power when the display state is updated (from black to white, or from white to black). Therefore, one of the prominent advantages of a bi-stable display lies in maintaining the displayed content continuously without consuming power if the displayed content does not change. In addition, bi-stable display technology such as E-ink mimics the appearance of ink tracks and read effect on ordinary paper, reflects light like ordinary paper, which has less irritation to eyes, and may read directly even in direct sunlight. Due to these advantages, its application on, for example, a mobile device has attracted much attention from both consumers and manufacturers. For example, many E-ink-based portable read devices have been unveiled in the market (e.g., Amazon Kindle, among others).

Considering that a mobile portable device is generally powered by a battery with limited duration, further reducing the power consumption of a bi-stable display is a valuable concern. For a portable device having a bi-stable display, most of the power is consumed by the display screen. As above mentioned, a bi-stable display only consumes power when the screen is updated. Therefore, prior art solutions of power saving for bi-stable displays share a common idea of comparing the overlapped portion between contents on two pages when displaying page shift, and the electronic field is not applied to the microcapsules corresponding to the screen spots with no need to be updated. However, prior art solutions are completely passive in that the power saving is entirely dependent on the overlap degree between contents of two successive pages. When two successive pages are significantly different from one another, the effect of power saving will be poor.

SUMMARY

In one embodiment, a processing method for a device having a bi-stable display includes transforming a target page to be turned to; calculating overlap between the transformed target page and a current page; and determining whether the overlap of the transformed page complies with a predetermined criterion.

In another embodiment, a processing apparatus for a device having a bi-stable display includes a transforming module configured to transform a target page to be turned to; a calculating module configured to calculate overlap between the transformed target page and a current page; and a determining module configured to determine whether the overlap of the transformed page complies with a predetermined criterion.

BRIEF DESCRIPTION OF SEVERAL VIEWS OF THE DRAWINGS

Exemplary embodiments of the invention will be described with reference to the drawings such that the above and other features, advantages and aspects thereof may be better understood, where:

FIGS. 5a-5d show an example of applying exemplary embodiments of the present invention in turning pages;

DETAILED DESCRIPTION

Hereinafter, embodiments of the present invention will be described only by way of example, with reference to in the accompanying figures. It shall be understood that the shown and described embodiments are merely exemplary, intended to explain the principle and sprit of the present invention, rather than limiting the scope of the invention.

Figure 1:
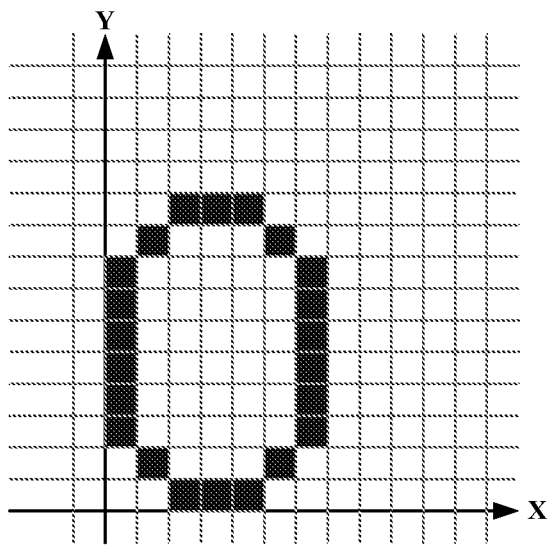
FIG. 1 shows a schematic diagram illustrating the basic principle of various embodiments of the present invention.
Figure 1:
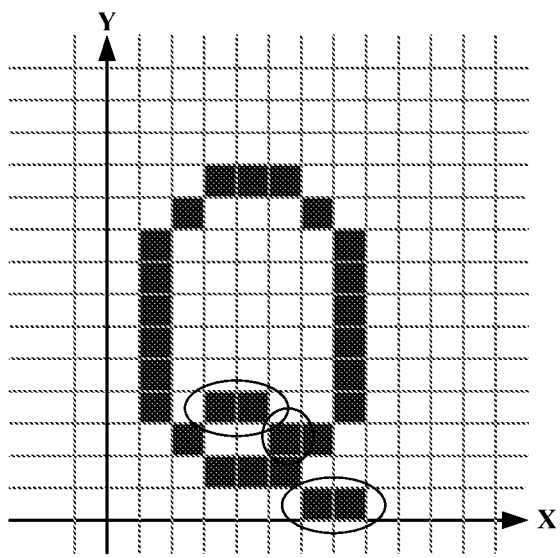

Referring to FIG. 1, a basic principle of the present invention is briefly shown. As shown, it is assumed that the first page is the current page whose content is an English letter "O", and the second page is target page to be shown whose content is an English letter "Q". It is further assumed that the horizontal and vertical coordinates of the centers of these two letters differ from each other by one coordinate unit, respectively. According to prior art solutions, several screen spots need to be updated when turning from the first page to the second, even though these two letters are very similar. This is because the overlap between these two letters is relatively small.

On the contrary, according to embodiments of the present invention, when turning pages, contents on the second page will be subjected to a series of transformations (as described in detail below), and calculating an overlap between the first and second pages after each transformation. Continuing to consider the scenario as shown in FIG. 1, it can be determined from calculation that the overlap between the two pages is maximized when the content of the second page is moved to origins of coordinates in both X and Y directions by one unit, respectively. At this point, the number of screen spots required to be updated is the least (highlighted ones as shown in the figure). In particular, taking each coordinate square in FIG. 1 as unit, there are 43 units required to be updated without utilizing the solution according to the present invention, while there are merely 5 units to be updated when utilizing the solution of the invention (highlighted in the figure). That is, in this case, the screen spots required to be updated is reduced by about 88% by using embodiments of the present invention. By displaying to the user the transformed second page, the number of screen sports to be updated is significantly decreased. Thereby, the power is saved efficiently.

Of course, it can be understood that in this scenario, the content of the second page will change in appearance. However, the crucial bottleneck of bi-stable display is how to reduce the amount of update, and therefore saving power. To this end, it is acceptable to sacrifice display effects (e.g., level of beauty) somewhat, as long as the user reading experience is not affected significantly. In addition, embodiments of the present invention enable automatic or interactive tradeoff between the power saving and display effects, as described below.

Now referring to FIG. 2, a flowchart of a processing method 200 for a device having bi-stable display according to an embodiment of the present invention will be described.

After the method 200 starts, at block S210, a target page to be turned to is transformed. In various embodiments of the present invention, the transformation may be performed either to the entire target page, or to a portion of content items contained in the target page. In addition, various kinds of transformations may be performed, including but not limited to affine transformation like shift, rotation, and scaling, and the transformations specific to content items contained in the target page, which will be described below with reference to FIG. 3.

It is noted that there may be more than one target page in block S210. For example, for an electronic reading like an E-book, a common reading habit is to read from page to page sequentially. In this case, the target page is usually the next one to the currently displayed page. At this point, not only the successive target page may be considered, but also method 200 may be performed with respect to a plurality of consecutive pages. As such, response time of interaction may be further reduced, thereby improving user experience. This will be further discussed below.

Moreover, based upon the habit of sequential reading, in some embodiments, the page next to the current page may be predetermined as the target page in default. In such embodiments, block S210 and subsequent operations of the method 200 may be performed during the display of the current page. The results may be stored in a cache for future use. In this way, the processed and cached target page may be displayed immediately after the user initiates a page turning, such that the time amount required to turn pages may be reduced while improving the effect of power saving. In addition, block S210 and subsequent operations of the method 200 may also be performed before a user starts to read the current page, and the processed results may be cached for future use.

In some embodiments, user is also allowed to indicate the specific target page interactively, which may be any page in the electronic reading. In this case, block S210 may be performed in response to the indication of turning to a target page.

Next, at block S220, the overlap between the transformed page and the current page is calculated. In some embodiments, a page may be treated as an image to process, and the overlap between two pages may be calculated using any existing or future developed algorithm for image comparison. In an exemplary embodiment, the overlap between the current page and the target page may be determined by performing an exclusive or (XOR) operation on the display value of the corresponding screen spots. Since an XOR operation is supported by most processors, such embodiment may be practiced either in software or in hardware. Experiments show that when an XOR operation is utilized to calculate the overlap between pages, the consumed resources and time will not affect user reading experience significantly. Other methods for calculating overlap are possible as well.

At block S230, it is determined whether the overlap of the transformed page complies with a predetermined criterion. As described above, during a series of transformations on the target page, the overlap between the transformed page and the current page will be calculated after each transformation. After all of the predetermined transformations are completed, for the plurality of resulting overlaps, it can be determined whether each overlap complies with a predetermined criterion. Then, a transformed target page corresponding to the overlap complying with the predetermined criterion may be determined. This transformed target page may be presented to the user thereafter. It shall be noted that the term "transformed target page" should be interpreted in a broad sense, i.e., also including the original target page (which may be interpreted as being performed a zero transformation). In other words, if it is determined from comparison that the non-transformed page complies with the predetermined criterion most, then the non-transformed page may be determined and presented to the user.

In some embodiments, the predetermined criterion in block S230 is related to the amount of the overlap. Apparently, the number of screen spots to be updated will decrease with the increase of overlap amount between two pages. Therefore, when the overlap amount between two pages is maximized, the number of screen spots to be updated is minimized, with the best power saving effect.

On the other hand, while increasing the overlap between two pages, it might be required to transform the target page greatly. However, too great transformation may overwhelmingly affect the display effect (e.g., beauty, read-friendly, or even legibility), which in turn dampens user experience. Therefore, in some embodiments, the above described predetermined criterion is also related to the page display effect. For example, in order to guarantee a certain display effect, transformation on the target page may be constrained (for example, the type of transformation, allowable maximum amount, etc), so as to avoid excessive transformation of the page display effect. In some embodiments, the transformations on the target page may be constrained based upon rules, which rules are used to ensure the page display effect. For example, the rules may specify the allowable types of transformations, and the upper limit of transformation amounts (e.g., the maximum number of pixels for shift, the maximum angle for rotation, the maximum displacement or deformation of a content item, etc). The rules may be predetermined by the device or in default, or set and modified by the user.

In addition, the predetermined criterion in block S230 may be related to the status of the device, for example, whether the device is connected to an external power source, the remaining battery power, etc. For example, when the device is powered by an external power source, or the battery power is sufficient, it may be reputed that the power consumption is not a crucial problem for the device. At this point, the predetermined criterion may be inclined to maintaining a better presentation effect, rather than simply maximizing the overlap amount. For example, in some embodiments, by setting the predetermined criterion appropriately, it is possible to decrease the allowable maximum values of transformations or even forbid transformation of the target page, so as to keep the original appearance to the utmost.

On the other hand, when the device is powered by a battery, with the decrease of battery power, power consumption becomes increasingly remarkable. In this event, the predetermined criterion may be adjusted dynamically so as to gradually sacrifice the display effect to improve power saving. For example, with the decrease of power, it is possible to gradually increase the allowed maximum values of transformations by setting the predetermined criterion appropriately, thereby reducing the number of screen spots to be updated. In some embodiments, when power saving is very crucial (for example, when the battery power is very low), the predetermined criterion may be selected such that the overlap amount between pages is maximized and thus the power is saved to the utmost.

It can be understood that the above description merely presents several exemplary factors related to the predetermined criterion. According to specific requirements and application environments, a skilled in the art is able to determine other factors affecting the predetermined criterion. In addition, the setting and modification of the predetermined criterion may be performed automatically by the device, or interactively by the user. For example, the device may provide the user with several options regarding the predetermined criterion via a user interface. For example, the device may allow the user to select whether to enable or disable the method 200. The user is also enabled to handle the tradeoff between the power saving and display effects by, for example, providing the user with options like "display effect preferred", "power saving preferred", etc. Moreover, interactive controls like a sliding bar or a slider may be provided to allow the user to gradually control the power saving, with keeping original page appearance and maximizing the overlap as two extreme endpoints. For another example, the user is allowed to control the maximum allowable values of the transformations.

Moreover, as described above in conjunction with block S210, there may be more than one target page. In this case, "complying with the predetermined criterion" in block S230 may comprise a total overlap for a plurality of pages complying with the predetermined criterion. For example, if the target pages include N consecutive pages, then for each target page n, page n−1 is treated as the current page. The total overlap complying with the predetermined criterion may comprise: the total power consumption of these N consecutive pages being minimized in page turning (globally best). This embodiment is especially advantageous for an e-book whose contents are relatively fixed. As described above, the user usually reads the e-book sequentially, and the contents on each page may be known in advance. Therefore, according to embodiments of the present invention, the optimized display mode for turning a plurality of pages sequentially may be determined.

The method 200 ends after block S230. By processing the target page according to the exemplary method 200 of the present invention, the overlap between the target page and the current page may be increased in an active manner, so as to achieve better performance of power saving while preserving the display effect.

Now exemplary embodiments of transforming the target page will be further explained with reference to FIG. 3. The method 300 shown in FIG. 3 may be performed as part of block S210 of the method 200 shown in FIG. 2.

After the method starts, at block S310, affine transformation may be performed on the entire target page. As known in the art, the affine transformation comprises shift, rotation, and scaling. As an example, Table 1 as follows shows codes written in MATLAB® for shifting the target page and calculating the overlap. In this example, the entire target page is moved upwards, downwards, left, and right directions in pixel. The maximum of shift is defined by MaxShift (for example, in pixel).

TABLE 1

```
y=xor(x1,x2);      % determining overlap between two pages, x1 and x2
which represent two pages
z=sum(y(:));       % summarizing the number of pixels to be changed
n=MaxShift;             % shifting along four directions by MaxShift pixels
ratio = zeros(n*2+1,n*2+1);
for i=-n:n
for j=-n:n
x3=circshift(x2,[i j]);    % generating page x3 by shifting
the page along four directions
y=xor(x1,x3);
z1=sum(y(:));              % summarizing number of pixels to
be updated after shifting
ratio(i+n+1, j+n+1) = z1/z;  % ratio of numbers of pixels to
be updated before and after shifting
end
end
```

As described above in conjunction with FIG. 2, after shifting the page each time, the overlap between the current and target pages may be calculated and recorded. Thereafter, the shift that most complies with the predetermined criterion (e.g., maximizing the overlap) can be determined by comparing the calculated overlaps. In experiments, the MaxShift as shown in Table 1 is set to 10 (in pixels). Experiments on the pages extracted randomly show that the overlap amount of two pages will increase about 18% in average by merely globally shifting the target page.

Rotation and scaling may be performed similarly. By block S310, global transformation is applied on the target page.

At block S320, affine transformation may be performed on content items contained in the target page. Content items for example may include one or more of texts, lines, paragraphs, images, or pre-defined portions. It can be understood that these are merely examples of content items. In fact, at step S320, affine transformations may be performed on any content item and element to be displayed as contained in the target page.

Specifically, information on the content items like texts, lines, paragraphs, and images contained in the target page may be obtained in various ways. For example, most of E-ink readers' devices provide Application Programming Interfaces (APIs) for acquiring information on display contents. Such APIs may be used to access the information related to display contents, including positional information on the screen, presentation information, editing information, etc. By block S320, fine tuning like shifting, rotation and/or scaling may be carried out to partial regions of the target page, thereby further increasing the possibility of the overlap complying with the predetermined criterion.

At block S330, the typesetting of the target page is transformed. Typesetting includes, but not limited to, alignment of texts and pictures, font, surrounding pattern of texts and pictures, line spacing, word spacing, etc. Other typesetting transformations are possible as well.

Figure 4A:
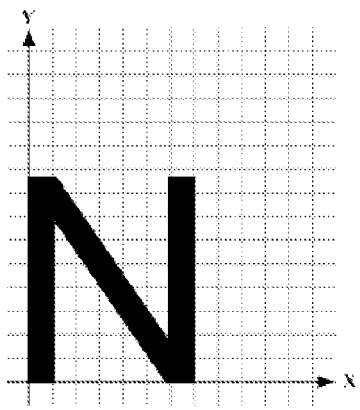
FIGS. 4a-4c show examples of transforming typesetting of a target page according to an embodiment of the present invention.
Figure 4B:
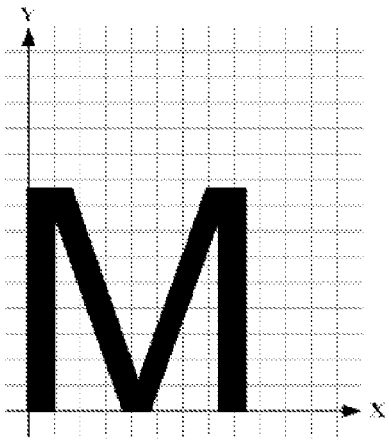
Figure 4C:
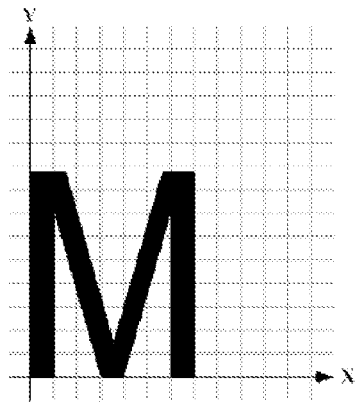

Specifically, transforming font may include changing the font family, for example, from "Arial" to "Times New Roman". In some embodiments, transforming font may also include customized transformations to a certain font family. Referring to FIGS. 4a-4c for example, FIGS. 4a and 4b show two English letters "N" and "M" in normal Arial, respectively. FIG. 4c shows an English letter "M" in transformed Arial. Assume that the letter "N" is displayed on the current page, and the letter "M" is displayed on the target page. Experiments using an ordinary bi-stable display show that through such customized font transformation, the number of screen spots to be updated is reduced from 4178 to 2571, approximately 40%. Such customized font transformations may be performed for example based upon predetermined rules or by dynamic programming (the calculation complexity in dynamic programming is relatively great).

It can be understood by a skilled in the art that FIGS. 4a-4c are merely intended to be illustrative, rather than limiting the scope of the invention. For example, the above described font family changes and customized font transformations are applicable to any language other than English as well.

The method 300 ends after block S330. According to the method 300, the target page is firstly transformed as a whole (block S310); then local transformations are performed on content items (block S320); and finally fine tunings are implemented by changing the typesetting (block S330). However, it can be understood that the method 300 is merely illustrative in that various steps may be performed in different order or omitted, or additional steps may be added. For example, some transformations may be enabled, while others may be disabled. As an example, based upon user's preference or instruction, the device may only allow performing global transformation on the target page while disabling transformations on content items. Alternatively, some types of transformations may be allowed, while the other types are disabled. In addition, the maximum allowable value for each transformation may be set or modified based upon various factors as described above.

Further, the method 300 involves different transformations on the target page, and the transformed results may be combined in various ways. For example, in some embodiments, the method 300 may be performed in a "greedy" manner (localized optimization). That is, in each operation, the transformation is selected such that the overlap complies with the predetermined criterion most. Alternatively, the method 300 may be performed based upon "dynamic programming" (global optimization). That is, the transformations are selected such that the total overlap complies with the predetermined criterion most. Other ways for combing transformation results are possible as well.

Figure 2:
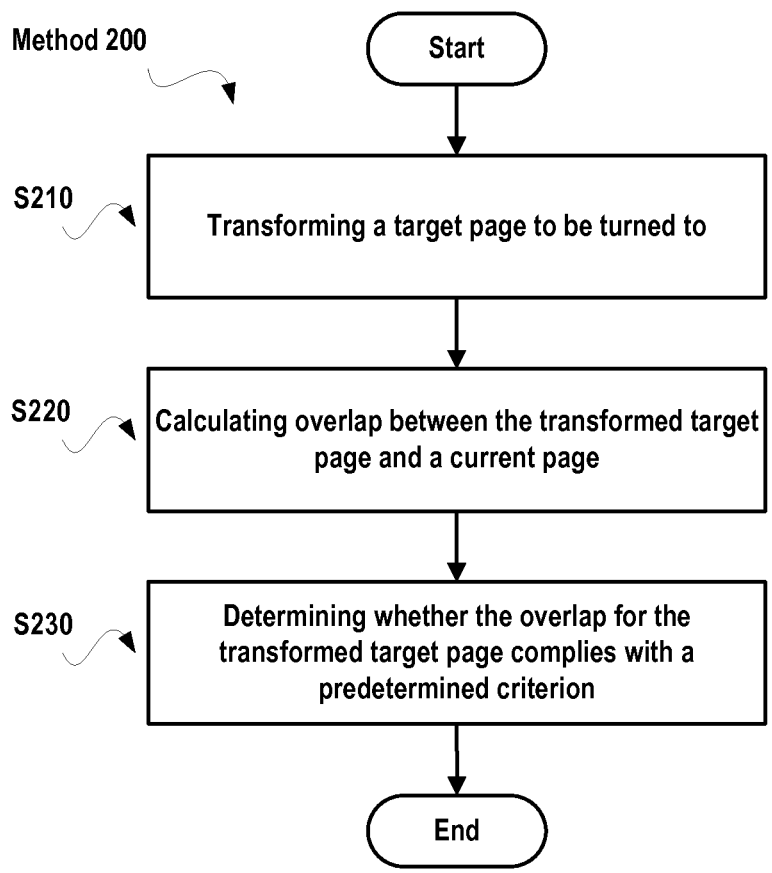
FIG. 2 shows a flowchart of a processing method for a device having a bi-stable display according to an embodiment of the present invention.
Figure 3:
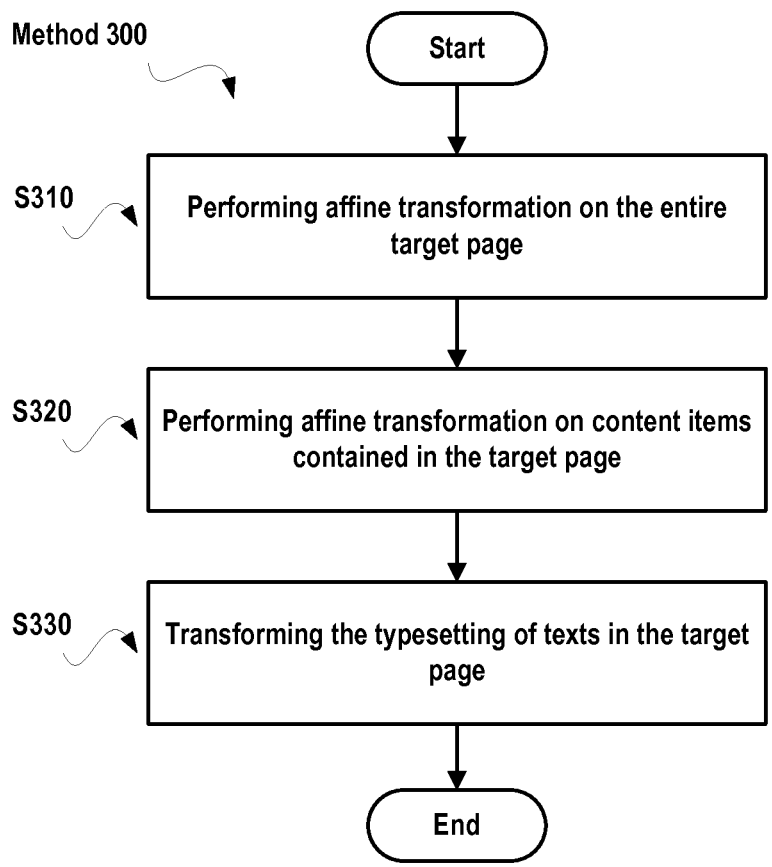
FIG. 3 shows a flowchart of a method for transforming a target page according to an embodiment of the present invention.

It should be particularly emphasized that though a certain amount of system resources and calculation time will be consumed by the operations such as transformation, calculation, and determination in the methods shown in FIGS. 2 and 3, Experiments show that such consumption will not cause a new system bottleneck or significantly dampen user experience.

In addition, though the above calculations consume a certain amount of power, the power consumption required for numerical calculation is relatively small since most power consumption comes from screen updates for a display based upon the bi-stable technology, as described above or known in the art. Therefore, compared with the additional power consumption, the power saving effect capable of being provided by this invention is dominant.

Figures 5C, 5D:
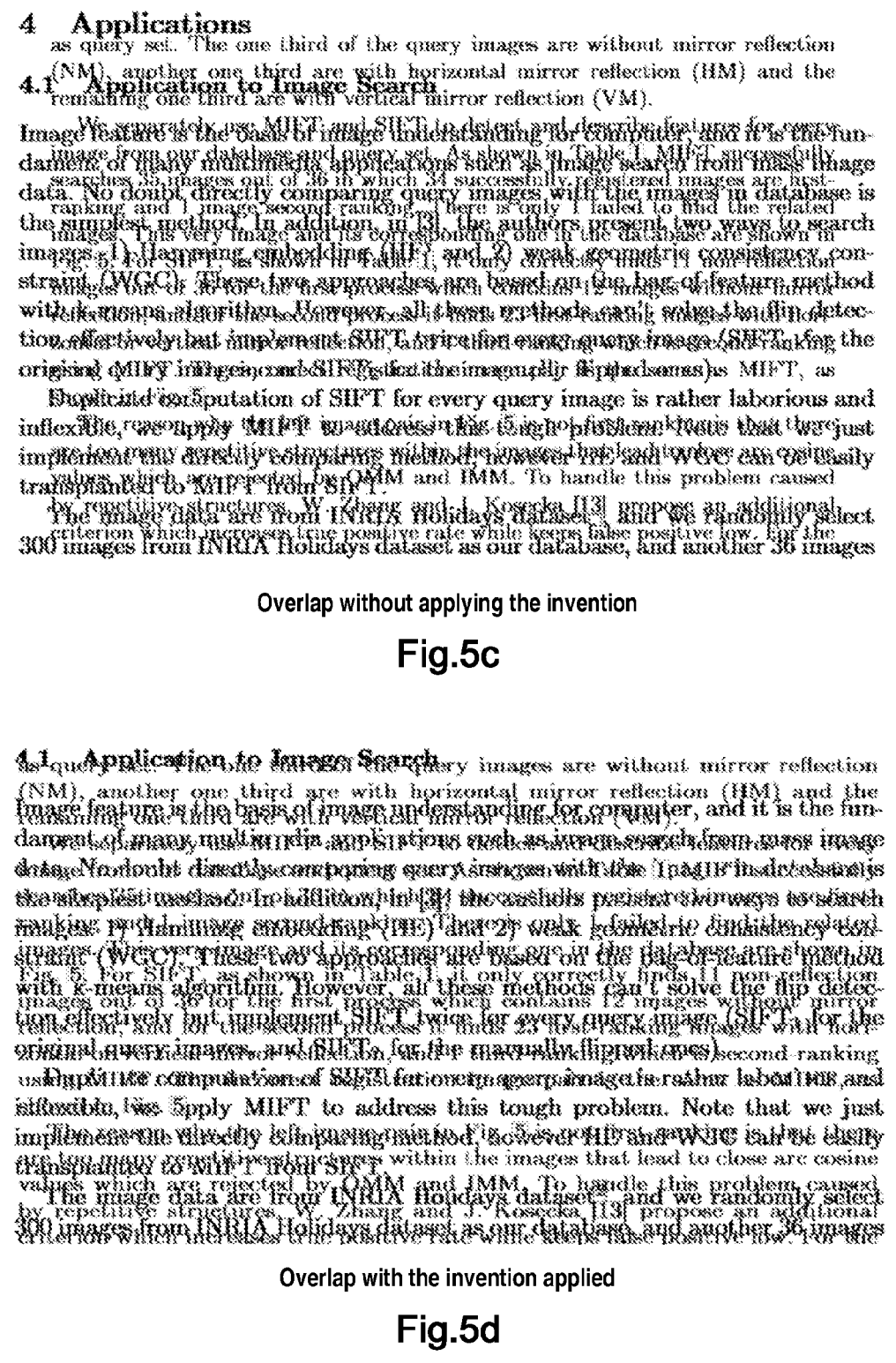

FIGS. 5a-5d show an example of applying exemplary embodiments of the present invention in turning pages. In this example, FIGS. 5a and 5b show contents as displayed on the current page and target page which are selected randomly. FIG. 5c shows the overlap between these pages without utilizing embodiments of the present invention, and FIG. 5d shows the overlap between pages with embodiments of the present invention employed. In this example, transformation is performed in a greedy manner (localized optimization), including shifting and scaling the entire page, as well as changing font, word spacing, etc. The predetermined criterion for the overlap is maximizing the overlap amount in the shown example. Experiments show that in the example shown in FIGS. 5a-5d, compared with the original target page, the overlap between the transformed target page and the current page may increase by about 23%, that is, additional 23% power saving is obtained. Experiments on a large number of pages indicate that the number of screen spots to be updated may be reduced by about 30%-50% by use of embodiments of the present invention, that is, additional 30%-50% power saving may be achieved. Therefore, embodiments of the present invention may increase the overlap between pages significantly, and thus reduce the number of screen spots to be updated, with more efficient power saving achieves.

Figure 6:
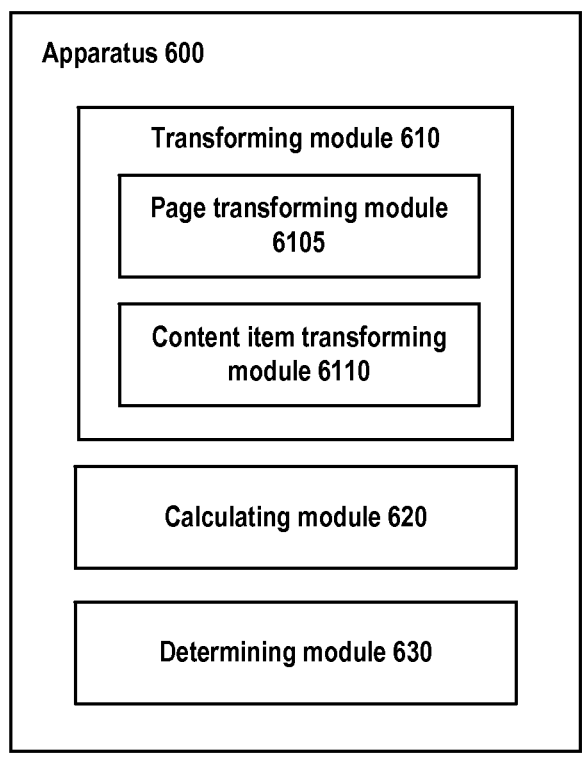
FIG. 6 shows a block diagram illustrating a processing apparatus for a device having a bi-stable display according to an embodiment of the present invention.

FIG. 6 shows a processing apparatus for a device having a bi-stable display according to an embodiment of the present invention. The apparatus 600 comprises a transforming module 610, a calculating module 620, and a determining module 630.

The transforming module 630 is for transforming a target page to be turned to. As shown, the transforming module 610 may include either or both of a page transforming module 6105 and a content item transforming module 6110. The page transforming module 6105 is for performing affine transformation on the entire target page. The content item transforming module 6110 is for transforming content items contained in the target page, including performing affine transformations on the content items, and transforming the typesetting of the target page. In some embodiments, the transforming module 610 may perform the transforming in response to an instruction for turning to the target page. Alternatively or additionally, the transforming module 610 may perform the transforming during display of the current page. In addition, the target page may be predetermined (for example, consecutive pages in sequential reading).

The calculating module 620 is for calculating overlap between the transformed target page and the current page.

The determining module 630 is for determining whether the overlap of the transformed page complies with a predetermined criterion. The predetermined criterion is related to one or more of the overlap amount, display page display effect, and device state. In addition, the target page includes a plurality of consecutive pages. In this case, the overlap complying with the predetermined criterion comprises: a total overlap of the plurality of consecutive pages complying with the predetermined criterion.

Figure 7:
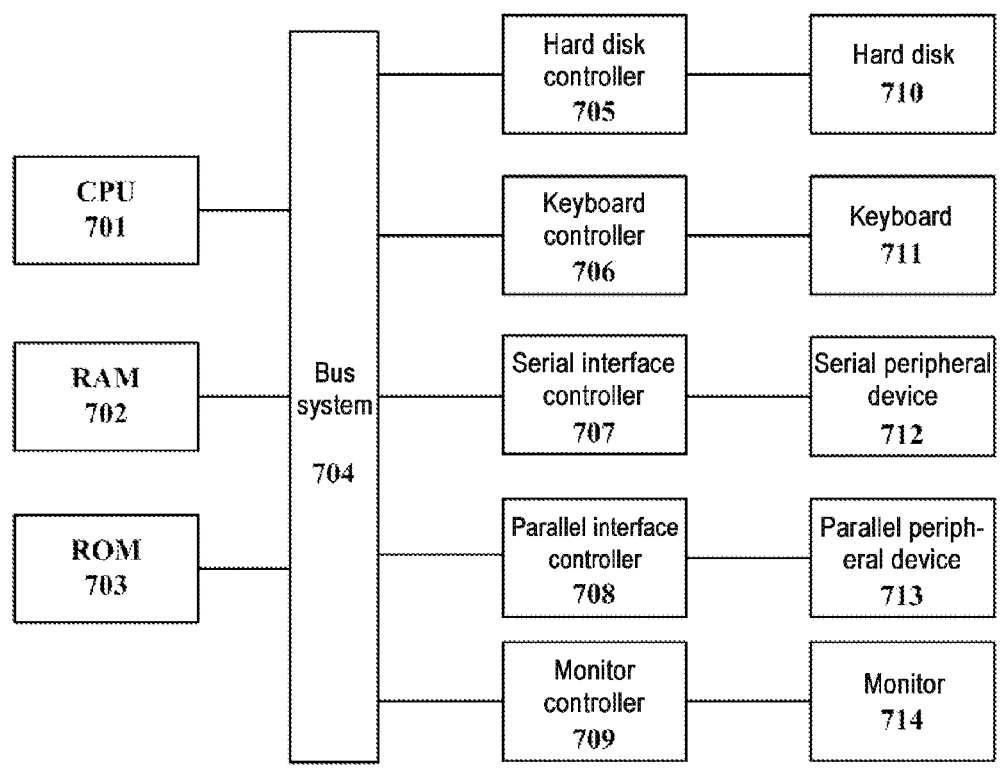
FIG. 7 shows a block diagram illustrating an exemplary computer system which is suitable for use in practicing embodiments of the present invention.

FIG. 7 shows a structural block diagram of an exemplary computer device for use in practicing embodiments of the present invention. The computer system as shown in FIG. 7 includes a CPU (Central Processing Unit) 701, a RAM (Random Access Memory) 702, a ROM (Read Only Memory) 703, a system bus 704, a hard disk controller 705, a keyboard controller 1006, a serial interface controller 707, a parallel interface controller 708, a monitor controller 709, a hard disk 710, a keyboard 711, a serial peripheral device 712, a parallel peripheral device 713 and a monitor 714. Among these components, connected to the system bus 704 are the CPU 701, the RAM 702, the ROM 703, the hard disk controller 705, the keyboard controller 706, the serial interface controller 707, the parallel controller 708 and the monitor controller 709. The hard disk 710 is connected to the hard disk controller 705; the keyboard 711 is connected to the keyboard controller 706; the serial peripheral device 712 is connected to the serial interface controller 707; the parallel peripheral device 713 is connected to the parallel interface controller 708; and the monitor 714 is connected to the monitor controller 709.

The block diagram as shown in FIG. 7 is presented merely for illustrative purpose, rather than limiting the scope of the invention. In some cases, some apparatus may be added or removed.

Embodiments of the present invention disclose processing method and apparatus for a device having a bi-stable display. Unlike prior art power saving solutions for bi-stable display, embodiments of the present invention attempt to increase the overlap between pages actively by transforming the target page, rather than merely depending on the overlap between pages passively. Since the dominant power consumption comes from the screen update, the power consumed by various calculation steps of the present invention is negligible compared with the power saved by use of embodiments of the present invention. Experiments show that compared with prior art, embodiments of the present invention may achieve power saving for a bi-stable display more efficiently while maintaining the display effect. In this way, the battery duration of such device is increased, and the user satisfactory is improved.

It should be noted that, the embodiments of the present invention can be implemented in software, hardware or the combination thereof. The hardware part can be implemented by a special logic; the software part can be stored in a memory and executed by a proper instruction execution system such as a microprocessor or a dedicated designed hardware. The normally skilled in the art may understand that the above method and system may be implemented with a computer-executable instruction and/or in a processor control code, for example, such code is provided on a bearer medium such as a magnetic disk, CD, or DVD-ROM, or a programmable memory such as a read-only memory (firmware) or a data bearer such as an optical or electronic signal bearer. The apparatuses and their components in these embodiments may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

The communication network as mentioned in this specification may comprise various kinds of networks, including but not limited to local area network (LAN), wide area network (WAN), an IP-protocol based network (for example Internet), and an end-to-end network (for example ad hoc network).

In addition, though operations of the present invention method are described in a particular order in the drawings, it is not required or implied that these operations must be performed according to this particular sequence, or a desired outcome can only be achieved by performing all shown operations. On the contrary, the execution sequences for the steps as depicted in the flowcharts may change. Additionally or alternatively, some steps may be omitted, a plurality of steps may be merged into one step, or a step may be divided into a plurality of steps.

Though the present invention has been depicted with reference to a plurality of embodiments, it should be understood that the present invention is not limited to the disclosed embodiments. On the contrary, the present invention intends to cover various modifications and equivalent arrangements included in the spirit and scope of the appended claims. The scope of the appended claims meets the broadest explanations and covers all such modifications and equivalent structures and functions.

What is claimed is:

1. A processing method for a device having a bi-stable display, the method comprising:
   transforming a target page to be turned to;
   calculating overlap between the transformed target page and a current page; and
   determining whether the overlap of the transformed page complies with a predetermined criterion.

2. A method as recited in claim 1, wherein the predetermined criterion is related to one or more of: overlap amount, display effect of the target page, and state of the device.

3. A method as recited in claim 1, wherein the transforming comprises performing affine transformation on the entire target page.

4. A method as recited in claim 1, wherein the transforming comprises performing affine transformation on a content item contained in the target page.

5. A method as recited in claim 4, where the content item comprises one or more of: a text, a line, a paragraph, an image or a pre-defined portion.

6. A method as recited in claim 1, wherein the transforming comprises transforming typesetting of the target page.

7. A method as recited in claim 6, wherein the typesetting comprises one or more of alignment of text/picture, font, surrounding pattern of text/picture, line spacing, word spacing.

8. A method as recited in claim 1, wherein the transforming is performed in response to an instruction for turning to the target page.

9. A method as recited in claim 1, wherein the target page is predetermined.

10. A method as recited in claim 1, wherein the transforming is performed during display of the current page.

11. A method as recited in any of claim 1, wherein the target page includes a plurality of consecutive pages, and wherein the overlap complying with the predetermined criterion comprises:
    a total overlap of the plurality of consecutive pages complying with the predetermined criterion.

12. A processing apparatus for a device having a bi-stable display, comprising:
    a transforming module configured to transform a target page to be turned to;
    a calculating module configured to calculate overlap between the transformed target page and a current page; and
    a determining module configured to determine whether the overlap of the transformed page complies with a predetermined criterion.

13. An apparatus as recited in claim 12, wherein the predetermined criterion is related to one or more of:

overlap amount, display effect of the target page, and state of the device.

14. An apparatus as recited in claim 12, wherein the transforming module comprises a page transforming module configured to perform affine transformation on the entire target page.

15. An apparatus as recited in claim 12, wherein the transforming module comprises a content item transforming module for performing affine transformation on a content item contained in the target page.

16. An apparatus as recited in claim 15, where the content item comprises one or more of:
 a text, a line, a paragraph, an image or a pre-defined portion.

17. An apparatus as recited in claim 12, wherein the content item transforming module is further configured to transform typesetting of the target page.

18. An apparatus as recited in claim 17, wherein the typesetting comprises one or more of:
alignment of text/picture, font, surrounding pattern of text/picture, line spacing, word spacing.

19. An apparatus as recited in claim 12, wherein the transforming module is for performing the transforming in response to an instruction for turning to the target page.

20. An apparatus as recited in claim 12, wherein the target page is predetermined.

21. An apparatus as recited in claim 12, wherein the transforming module is for performing the transforming during display of the current page.

22. An apparatus as recited in claim 12, wherein the target page includes a plurality of consecutive pages, and wherein the overlap complying with the predetermined criterion comprises:
 a total overlap of the plurality of consecutive pages complying with the predetermined criterion.

* * * * *